US005915927A

United States Patent [19]

Kuromitsu

[11] Patent Number: 5,915,927

[45] Date of Patent: Jun. 29, 1999

[54] RECIPROCATING PUMP FOR GENERATING FLUID PRESSURE

[75] Inventor: Hiromu Kuromitsu, Chiryu, Japan

[73] Assignee: Aisin Seiki Kabushiki, Kariya, Japan

[21] Appl. No.: 08/922,442

[22] Filed: Sep. 3, 1997

[30] Foreign Application Priority Data

Sep. 4, 1996 [JP] Japan .................................... 8-234515

[51] Int. Cl.[6] ................................ F04B 5/02; F04B 1/00; F04B 25/04

[52] U.S. Cl. .......................... 417/250; 417/470; 417/503; 417/549; 417/547; 417/554

[58] Field of Search .................................... 417/250, 470, 417/503, 549, 547, 554

[56] References Cited

FOREIGN PATENT DOCUMENTS 6474153 3/1989 Japan .

*Primary Examiner*—Charles G. Freay
*Assistant Examiner*—Daniel E. Moses
*Attorney, Agent, or Firm*—Sughrue, Mion, Zinn , Macpeak & Seas, PLLC

[57] ABSTRACT

A plunger pump includes a piston which is driven for reciprocatory motion and associated with a check valve. A space within a cylinder is partitioned by a piston 1*p* into a first space A which communicates with a discharge port 1*ep* and a second space B which communicates with a suction port 1*ip*. To reduce the peak value of a fluctuation in the suction pressure, a third port 2*ip* communicating with the first space A is added, and the suction port 1*ip* and the third port 2*ip* are connected in common to a suction line Pin through check valves 20 and 19, respectively. The first space A has a diameter greater than the diameter of the piston while the second space B has a diameter which is comparable to the diameter of the piston and hence is less than that of the first space A. On the forward stroke of the piston, a braking liquid is drawn into the second space from the suction line Pin. On the return stroke of the piston, a braking liquid is drawn into the first space A from the suction line Pin, and a braking liquid flows from the second space B to the first space A through a center opening in the piston. On the forward stroke of the piston, the braking liquid in the first space A is discharged through a discharge port 1*ep*. The suction of the braking liquid into the cylinder from the suction line Pin is dispersed between the forward and the return stroke, thus suppressing a peak in the fluctuation in the suction pressure.

6 Claims, 6 Drawing Sheets

2
3
4a
4b
4c
4
6
7
8
9
10
Fr
11
Rr
12
18
Pout
1ep
1ps
A
1vs
1p
1v
1ip
1f
3ip
B
Pin
1
1m
M
S
1ax
1ca

RECIPROCATING PUMP FOR GENERATING FLUID PRESSURE

FIELD OF THE INVENTION

The invention relates to a reciprocating pump which generates a fluid pressure for driving machine elements, and in particular, while not intended to be limited thereto, to such pump which supplies a high/low fluid pressure to a brake pressure circuit which applies or releases a braking pressure to or from wheel brakes.

BACKGROUND OF THE INVENTION

A pump which drives a piston for reciprocatory motion is used as a source of braking pressure for a brake pressure circuit which controls wheel brake pressures in a number of modes including ABS(anti-lock brake pressure control), TRC(traction control), an automatic brake control inclusive of an automatic deceleration, an automatic stop, an automatic turn, a control over distribution of braking effort among wheels, for example. Such pump includes one referred to as a plunger pump.

A typical plunger pump used in a brake pressure circuit comprises a pair of pumping mechanisms, one eccentric cam and a single electric motor. A first pumping mechanism comprises a first cylinder, a first piston disposed therein, and a first return spring which urges the first piston against the cam surface of the eccentric cam. A second pumping mechanism is similarly constructed, but is disposed symmetrically to the first pumping mechanism with respect to the eccentric cam. The eccentric cam is driven for rotation by the motor, whereupon the piston in each pumping mechanism reciprocates. As a braking liquid is drawn into the cylinder of the first pumping mechanism, the braking liquid is discharged from the cylinder of the second pumping mechanism. A pump pressure from the first pumping mechanism is used for intensification/decompression of wheel brakes associated with two of four wheels of a vehicle, namely, front/rear and left/right wheels, while a pump pressure from the second pumping mechanism is used for intensification/decompression of the remaining two wheel brakes.

Japanese Laid-Open Patent Application No.74,153/89 discloses a brake controller operating with a single electric motor such that when a control over the wheel brake pressures is required without depression of a brake pedal such as during TRC, the pump is driven by the motor and a wheel brake circuit is switched into a circuit connection which applies the discharge pressure from the pump to wheel brakes.

A conventional arrangement for a motor driven pump which is used in this manner is illustrated in FIG. 4. As shown, when solenoid valves 4, 6–9 are set up such that a braking liquid pressure from a brake master cylinder 3 is fed to a wheel brake 10 associated with a front, right wheel and a wheel brake 11 associated with a rear, right wheel, as a driver depresses a brake pedal 2, a negative pressure booster intensifies the depression pressure before it is applied to the piston of the master cylinder 3, and accordingly, a braking liquid pressure at the output port of the master cylinder 3 rises. This braking liquid pressure is fed through a switching valve 4, solenoid valves 6 and 7 to be applied to the wheel cylinders of the wheel brakes 10 and 11. In the present example, a braking effort is applied to a front, right wheel Fr and a rear, right wheel Rr. While not shown, the master cylinder 3 includes another port which is connected with a similar brake pressure circuit, which similarly applies a braking effort to a front, left wheel and a rear, left wheel.

When it is desired to apply a braking liquid pressure to the wheel brakes 10, 11 automatically without depression of a brake pedal (as during TRC), the switching valve 4 is electrically energized or turned on by a controller (not shown) which essentially comprises a computer. Thereupon, a port 4*a* of the switching valve 4 which communicates with the output of the master cylinder 3 is disconnected from a port 4*b* which is connected to the solenoid valves 6 and 7, but is connected to a port 4*c* which communicates with a suction line Pin of a pump 1. An electric motor 1*m* which drives the pump 1 is energized. This allows the pump 1 to draw the braking liquid from the master cylinder 3 through the switching valve 4 and the suction line Pin, and to discharge it through a discharge line Pout. The discharge pressure is fed to the wheel brake 10 (or 11) through the solenoid valve 6 (or 7). When an intensification of the wheel brake 10 is required, the solenoid valve 7 is closed while the solenoid valve 6 is opened. When an intensification of the wheel brake 11 is required, the solenoid valve 6 is closed while the solenoid valve 7 is opened.

As the motor 1*m* rotates, an eccentric cam shaft 1*ax* is driven for rotation, and the center of rotation of a roller (eccentric cam) 1*ca* mounted thereon depicts a circular motion of a radius S, whereby it pushes a piston 1*p* which is urged by a coiled compression spring 1*ps* outward. In this manner, the piston 1*p* reciprocates with a stroke of 2S. The piston 1*p* is formed with a channel 1*f* which always opens to a suction port 1*ip* and which communicates with a pressure chamber A. An opening of the channel if located toward the pressure chamber A is closed by a ball 1*v*, acting as a check valve, which is urged by a coiled compression spring 1*vs*. When the piston 1*p* is pushed in a direction to reduce the volume of the pressure chamber A, the channel 1*f* is closed by the ball 1*v*, whereby the fluid in the pressure chamber A is pressurized by the piston 1*p* to feed the wheel brake 10 (or 11) through a discharge port 1*ep*, a check valve 18 and solenoid valve 6 (or 7). As the piston 1*p* is on its return stroke, the presence of the check valve 18 is effective to prevent the braking liquid from the solenoid valve 6 (or 7) from being drawn into the pressure chamber A, which therefore assumes a negative pressure, allowing the ball 1*v* to be opened to allow a low pressure braking liquid from the master cylinder to flow into the pressure chamber A through the switching valve 4, suction line Pin, suction port 1*ip* and channel 1*f*. A braking liquid from a reservoir 12 also flows into the pressure chamber A through a suction port 3*ip*. As the piston 1*p* reciprocates repeatedly, the discharge from the pressure chamber A to the check valve 18 and the suction into the pressure chamber A through the suction port 1*ip* and the channel 1*f* are repeated in an alternate fashion. Since the switching valve 4 provides a connection between the ports 4*a*/4*c*, a fluctuation in the suction of the pump 1 is transmitted to the brake pressure output port of the master cylinder 3 through the suction line Pin and the switching valve 4.

The plunger pump described above undergoes one suction stroke per reciprocation of the piston 1*p* (or per revolution of the eccentric cam 1*ca*), and hence the fluctuation in the suction of the pump 1 is pronounced. Accordingly, when the pump 1 is driven while the switching valve 4 is turned on, the pronounced fluctuation in the suction is transmitted to the master cylinder 3 through the suction line Pin and the valve 4, as mentioned above. As a consequence, if a brake pedal is depressed by the driver under this condition, the pedal 2 will be depressed to a greater degree. If the valve 4 connects between the ports 4*a*/4*c* and the pump 1 continues to be driven as the driver depresses the pedal 2 and increases the depression, because the braking liquid flows from the master cylinder 3 through the pump 1 to the wheel brake, there will be no further depression of the pedal 2 during the discharge stroke of the pump 1 while the depression will increase during the suction stroke, causing a stepwise depression of the pedal 2, which imparts an extraordinary or abnormal sense to the driver.

SUMMARY OF THE INVENTION

It is an object of the invention to smooth out a fluctuation in the suction of a reciprocating pump.

In accordance with the invention, a reciprocating pump comprises a cylinder (1_c_); a piston (1_p_) disposed within the cylinder to divide the internal space thereof into a first space (A) and a second space (B) and including a channel (1_f_) which provides a communication between the first space (A) and the second space (B), and a first check valve (1_v_) which permits a flow of a fluid through the channel (1_f_) in a direction from the second space (B) to the first space (A) while blocking a flow in the reverse direction, the piston having a first pressure receiving area which receives a fluid pressure in the second space (B) in a direction of the center axis of the cylinder which is less than a second pressure receiving area which receives a fluid pressure in the first space (A) in the same direction; a second check valve (18) which permits a flow of a fluid from the first space (A) to discharge line (Pout) disposed outside the cylinder while blocking a flow in the reverse direction; a third check valve (20) which permits a flow of a fluid from a suction line (Pin) disposed outside the cylinder to the second space (B) while blocking a flow in the reverse direction; a fourth check valve (19) which permits a flow of a fluid from the suction line (Pin) to the first space (A) while blocking a flow in the reverse direction; and means (1_ps_, 1_ca_, 1_ax_, 1_m_) for driving the piston (1_p_) for reciprocatory motion. It is to be understood that in order to facilitate understanding, parts corresponding to those appearing in an embodiment shown in the drawings and to be described later are designated by like reference numerals and characters as used in the embodiment in parentheses.

During the discharge stroke when the piston (1_p_) moves in a direction to reduce the volume of the first space (A) and to increase the volume of the second space (B), the fourth check valve (19) blocks a flow of a fluid from the first space (A) to the suction line (Pin), and accordingly, the fluid in the first space (A) passes through the second check valve (18) to the discharge line (Pout). In the discharge stroke, the second space (B) is expanded by the piston (1_p_), whereby the fluid in the suction line (Pin) flows into the second space (B) through the third check valve (20). (This is referred to as a suction during the discharge stroke.)

During the suction stroke when the piston (1_p_) moves in a direction to increase the volume of the first space (A) and to reduce the volume of the second space (B), the first check valve (1_v_) opens to allow the fluid in the second space (B) to pass through the channel (1_f_) into the first space (A). However, since the third check valve (20) blocks a flow of the fluid from the second space (B) to the suction line (Pin) and since the pressure receiving area of the piston (1_p_) which receives the fluid pressure in the second space (B) in the direction of the center axis of the cylinder is less than the pressure receiving area which receives the fluid pressure in the first space (A) in the same direction, only an amount of fluid less than an increase in the volume of the first space (A) which occurs as a result of a movement of the piston can flow from the second space (B) to the first space (A), and a differential amount of fluid flows from the suction line (Pin) to the first space (A) through the fourth check valve (19). (This is referred to as a suction during the suction stroke.)

Thus, in accordance with the invention, the fluid is drawn into the pump from the suction line (Pin) during both the discharge and the suction stroke. In the conventional practice, the fluid is drawn into the pump from the suction line only on return or suction stroke during one reciprocatory motion of the piston, and this explains for an increased amount of suction per suction process. However, with the pump of the invention, the suction of the fluid is distributed or dispersed in both discharge and suction strokes, and this reduces the amount of suction per suction process or smoothes out a fluctuation in the suction. Accordingly, when the pump of the invention is used with a brake pressure circuit as mentioned above, an extraordinary or abnormal sense as caused by an unintended depression of the pedal 2 or a stepwise depression of the pedal 2 as the depression is gradually increased is eliminated or suppressed.

In a preferred embodiment of the invention, the pump additionally includes a rod (1_r_) which extends through the second space (B) from outside the cylinder in the direction of the center axis thereof and continues to the piston (1_p_). The pressure receiving area of the piston (1_p_) which receives the fluid pressure in the second space (B) is reduced by an amount equal to the cross-sectional area of the rod (1_r_), and is less than the pressure receiving area thereof which receives the fluid pressure in the first space (A). Accordingly, assuming an equal cylinder diameter for the first space (A) and the second space (B), the difference between the pressure receiving areas of the piston which receive the fluid pressures in the first space (A) and the second space (B) is equal to the cross-sectional area of the rod. Hence, during the suction stroke, an amount of fluid equivalent to the cross-sectional area of the rod multiplied by the piston stroke (2S) is drawn into the first space (A). Of the single suction equal to the cross-sectional area of the piston multiplied by the piston stroke (2S), a volume of fluid which is equal to this single suction from which the volume calculated as the cross-sectional area of the rod multiplied by the piston stroke (2S) is substracted is drawn into the second space (B) during the discharge stroke, and is then passed into the first space (A) through the channel (1_f_) during the next suction stroke. Thus it will be seen that the amount of fluid drawn into the pump during the suction stroke is reduced, as compared with the conventional practice, by an amount which is drawn into the second space (B) during the discharge stroke (dispersed fraction), and the dispersed fraction can be determined by the rod diameter.

In the preferred embodiment of the invention, the cylinder (1_c_) includes a first cylinder space of a first diameter which provides the first space (A), and a second cylinder space of a second diameter which is smaller than the first diameter which provides the second space (B) and which continues to the first cylinder space. The pressure receiving surface of the piston (1_p_) which opposes the first space (A) is disposed within the first cylinder space while the pressure receiving surface of the piston which opposes the second space (B) is disposed within the second cylinder space. Reciprocatory drive means (1_ps_, 1_ca_, 1_ax_, 1_m_) contains a coiled compression spring (1_ps_) disposed within the first cylinder space (A), and acting to return the piston (1_p_).

In a modification which employs a linear motor coil disposed outside the cylinder for reciprocatingly driving the piston, the rod may be omitted, and a stepped piston may employed which has a portion of an increased diameter which is fitted into the first cylinder space (A) and another portion of a reduced diameter which is fitted into the second cylinder space (B). Alternatively, a rod may be arranged to extend through the first space (A), with a choice such that the cross-sectional area of the first space (A) from which the cross-sectional area of the rod is subtracted is greater than the cross-sectional area of the second space (B).

Other objects and features of the invention will become apparent from the following description of an embodiment shown in the drawings.

DESCRIPTION OF PREFERRED EMBODIMENT

Figure 1:
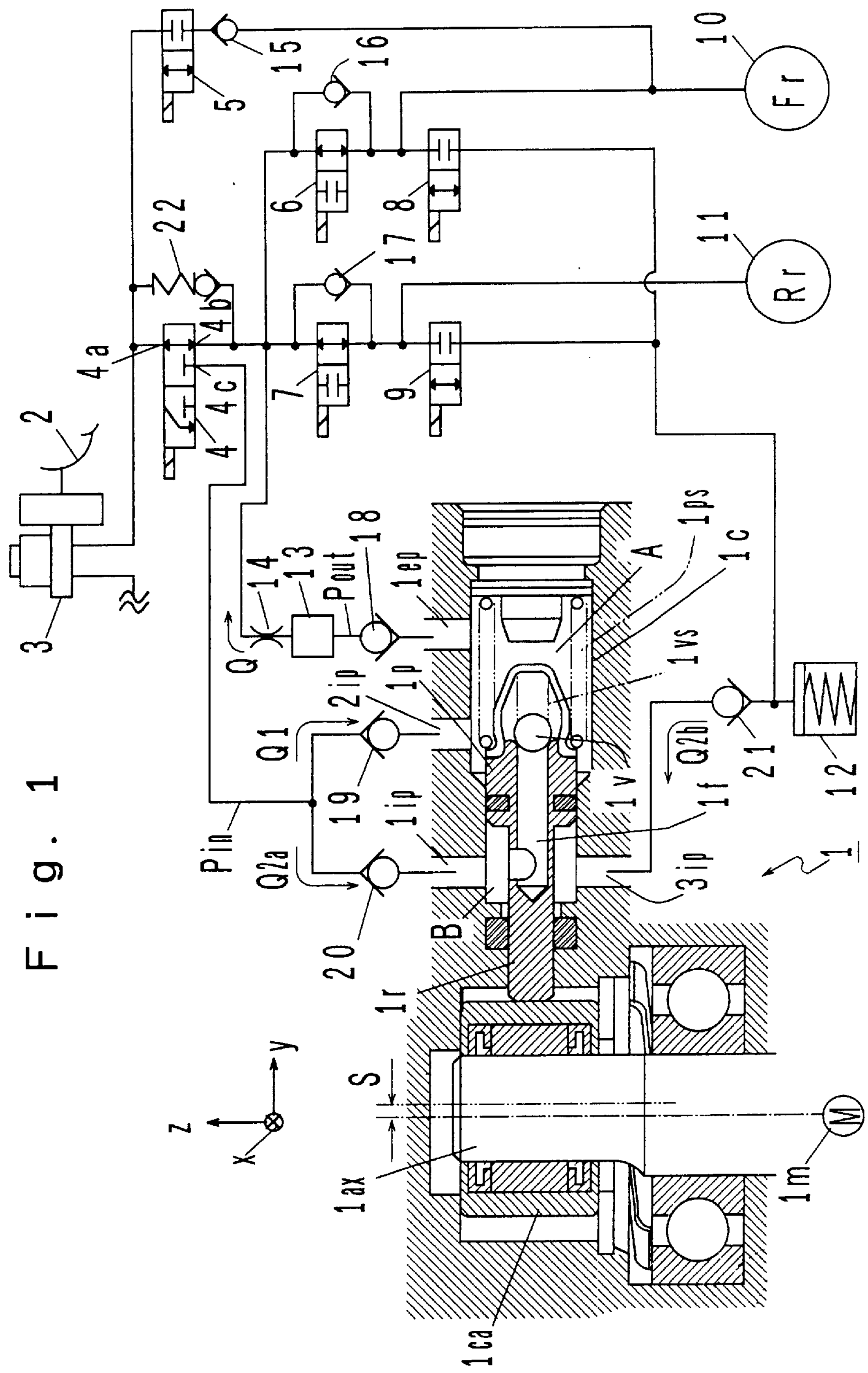
FIG. 1 is a block diagram of a brake pressure circuit equipped with one embodiment of the invention, with an arrangement around a pump plunger being shown in longitudinal section.

Referring to FIG. 1 which shows a brake pressure circuit equipped with a pump 1 according to one embodiment of the invention, in response to a depression of a brake pedal 2, a brake master cylinder 3 generates a braking pressure, which is applied through a solenoid operated switching valve 4 and solenoid valves 6 and 7 to wheel brakes 10 and 11, respectively, a braking effort being applied to a front, right wheel Fr and a rear, right wheel Rr in this example. A solenoid valve 5 and a check valve 15, connected in series, are provided to apply a braking pressure from the master cylinder 3 to the wheel brake 10 directly in the event the solenoid valve 6 in the brake pressure circuit malfunctions, resulting in the braking pressure applied to the wheel brake 10 which is reduced below the braking pressure from the master cylinder 3. When the solenoid valve 5 is turned on (or electrically energized to open), the braking pressure from the master cylinder 3 is applied to the wheel brake 10 through the valves 5 and 15. While not shown, it should be understood that a brake pressure circuit similar to the one described above in connection with the front, right wheel Fr and the rear, right wheel Rr is provided between the master cylinder 3 and a front, left wheel Fl and a rear, left wheel Rl, both not shown.

When the brake is not operated, or when it is desired to apply a braking pressure to the wheel brakes 10 and 11 automatically as during TRC, a controller, not shown, which essentially comprises a computer turns on the switching valve 4 to connect between ports 4*a*/4*c* and also energizes an electric motor 1*m*. The pump 1 is then driven by the motor, and the braking liquid from the master cylinder 3 is drawn into the pump 1 through the switching valve 4 and a suction line Pin, and after being boosted, is fed to the wheel brake 10 (or 11) through a discharge line Pout and the solenoid valve 6 (or 7).

When the wheel brake 10 (or 11) is to be decompressed, a solenoid valve 8 (or 9) is turned on, thus releasing the wheel brake pressure to a reservoir 12. A controller, not shown, turns the solenoid valves 6–9 on and off to adjust the braking liquid pressure applied to the wheel brake 10 (or 11) to prevent a wheel spinning from occurring. In the event the pressure of the braking liquid applied to the wheel brake 10 (or 11) rises above the discharge pressure of the pump 1, check valve 16 (or 17) is operated to return it to the input side of the solenoid valve 6 (or 7).

During ABS control, when a driver depresses the brake pedal 2, the switching valve 4 remains off, but the pump 1 is driven. For example, if the wheel Fr or Rr tends to lock as the driver depresses the brake pedal 2, a controller, not shown, turns the solenoid valves 6–9 on or off, applying a braking pressure to the wheel brake 10 (or 11) while preventing a locked condition. When automatically braking a wheel or wheels without operating the brake pedal, the switching valve 4 is turned on and simultaneously the pump 1 is driven, applying a braking liquid pressure to a wheel brake and turning the solenoid valves 6–9 on and off to adjust the liquid pressure. A braking liquid which is extracted from the wheel brake 10 (or 11) for purpose of decompression is stored in the reservoir 12 through the solenoid valves 8, 9 and is drawn into the pump 1 through a check valve 21 and a third suction port 3*ip*. The braking liquid which is boosted by the pump 1 is fed through a discharge port 1*ep*, a check valve 18, a discharge line Pout, an accumulator 13 and an orifice 14 to the solenoid valve 6 (or 7).

Figure 2:
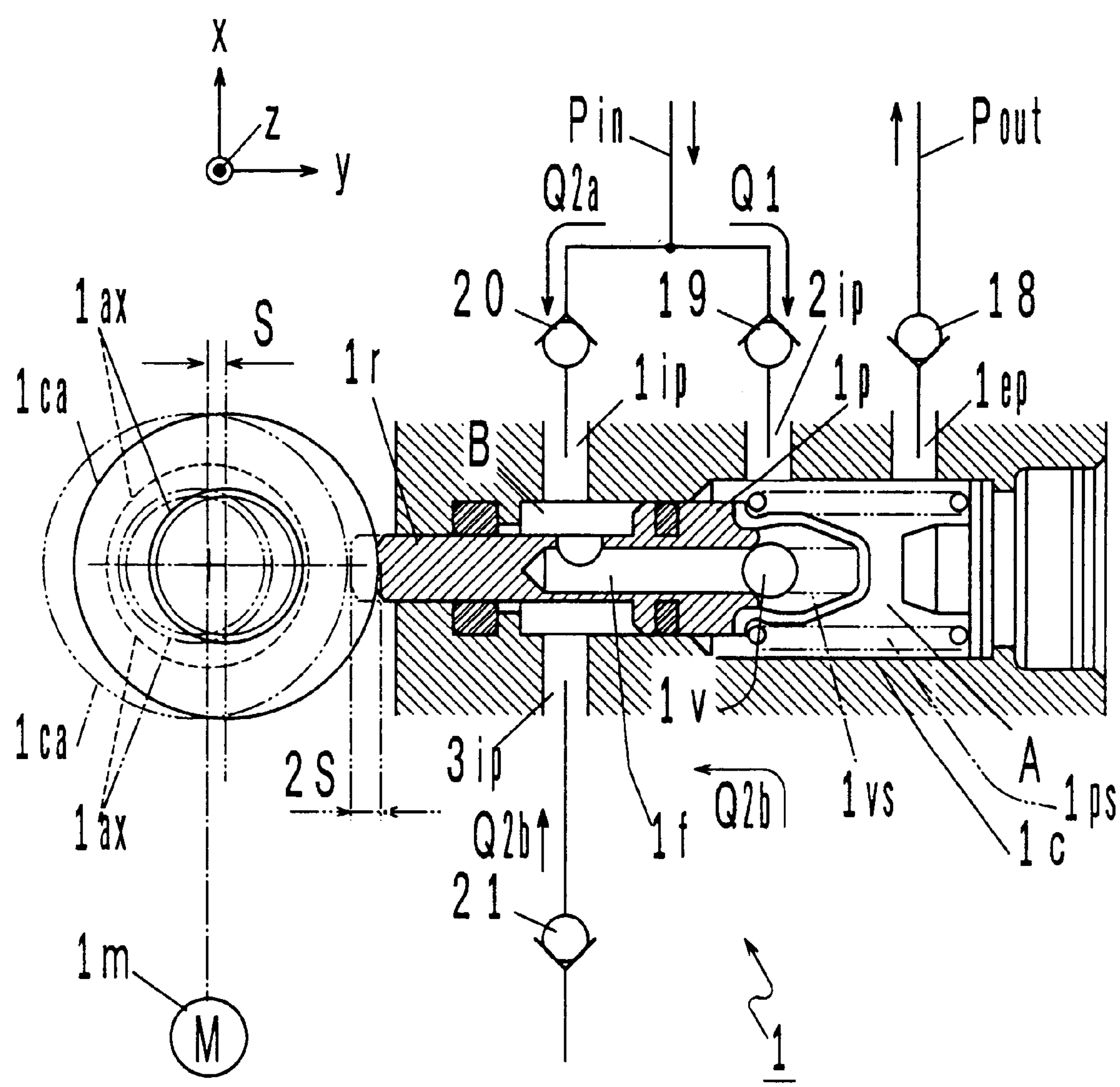
FIG. 2 is a longitudinal section, to an enlarged scale, of a principal part of the pump shown in FIG. 1, with the remainder shown schematically.

Referring to FIG. 1 together with FIG. 2, the pump 1 comprises a drive assembly including a motor 1*m*, an eccentric shaft 1*ax* and an eccentric cam (eccentric roller) 1*ca*; a plunger (piston) including a rod 1*r*, a piston 1*p*, a channel 1*f*, a ball 1*v* or a first check valve, a coiled compression spring 1*vs* which urges against the ball 1*v*, and a valve retainer 1*vr*; a cylinder 1*c* including a first suction port 1*ip*, a second space B, a second suction port 2*ip*, a first space A and the discharge port 1*ep*; a third check valve 20 and a fourth check valve 19 which serve the suction purpose, and a second check valve 18 for discharge.

The first suction port 1*ip* and the second suction port 2*ip* are connected to the suction line Pin through the third check valve 20 and the fourth check valve 19, respectively, while the discharge port 1*ep* is connected to the discharge line Pout through the second check valve 18. An accumulator 13 and an orifice 14 form together a pressure damper, absorbing any rapid pressure change. If the pressure change cannot be absorbed and the discharge pressure of the pump 1 exceeds a given upper limit, a relief valve 22 releases the boosted braking liquid to the master cylinder 3.

When the motor 1*m* is set in motion, the eccentric cam 1*ca* undergoes an eccentric motion, whereby the plunger (comprising the combination of rod 1*r* and piston 1*p*) abutting against the surface of the eccentric cam 1*ca* reciprocates with a stroke of 2S.

Suppose now that with rotation of the eccentric cam 1*ca*, the piston 1*p*, as urged by the spring 1*ps*, is on its return stroke, thus moving from right to left as viewed in FIG. 2. At this time, the pressure in the first space A is descending, and hence braking liquid Q1 flows into the first space A through the fourth check valve 19 and the second suction port 2*ip*. The braking liquid in the discharge line Pout is blocked by the second check valve 18, and cannot return to the first space A. On the return stroke of the piston 1*p*, the pressure in the second space B rises, but the third check valve 20 blocks a flow from the second space B to the suction line Pin, and the first check valve or ball 1*v* opens to allow the braking liquid in the second space B to flow to the first space A through the channel 1*f*.

Subsequently when the piston 1*p* enters the forward stroke as urged by the eccentric cam 1*ca* (and thus moves from left to right as viewed in FIG. 2), the braking liquid in the first space A is boosted by the pushing action of the piston 1*p* and is expelled through the discharge port 1*ep* and the second check valve 18 into the discharge line Pout. At this time, the fourth check valve 19 blocks a flow from the first space A to the suction line Pin. On the forward stroke of the piston 1*p*, the pressure in the second space B is descending, whereby braking liquid Q2*a* (FIG. 1) in the suction line Pin flows into the second space B through the third check valve 20. When the pressure in the reservoir 12 is higher, braking liquid Q2*b* (FIG. 1) flows into the second space B through a fifth check valve 21. The purpose of the check valve 21 is to prevent the braking liquid from the master cylinder 3 from flowing into the reservoir 12 when the driver depresses the brake pedal 2 while the switching valve 4 is turned on.

Since the ball 1*v* closes the channel 1*f*, there can be no liquid flow from the first space A to the second space B.

Thus it will be seen that on the forward stroke of the piston 1*p*, the braking liquid Q2 (Q2*a* and Q2*b*) flows into the second space B while on the return stroke of the piston 1*p*, braking liquid Q2 and braking liquid Q1 both flow into the first space A.

As mentioned previously, if the pump 1 is driven while the switching valve 4 is on, a fluctuation in the suction of the pump 1 is transmitted to the master cylinder 3 through the suction line Pin and the switching valve 4. If this occurs during the time the driver is depressing the brake pedal 2, the latter will be further depressed in conformity to the suction stroke.

However, in accordance with the invention, the suction of the fluid takes place in a dispersed manner between the forward or discharge stroke and the return or suction stroke. The dispersion allows the amount of each suction fraction to be reduced, thus smoothing out a fluctuation in the suction. Accordingly, when the pump of the invention is applied in a brake pressure circuit for ABS control, for example, the occurrence of an extraordinary or abnormal sense as caused by an unintended depression of brake pedal 2 or a stepwise depression of the pedal as the depression is increased can be eliminated.

The piston 1*p* continues to the rod 1*r* which extends through the second space B, with the remote end of the rod 1*r* abutting against the eccentric cam 1*ca*. Then, denoting the cross-sectional area of the rod 1*r* by C, the cross-sectional area of the piston 1*p* (or the cross-sectional area of cylinder for the space B) by D, the stroke of the piston 1*p* by 2S, the amount of liquid which flows into the first space A through the second suction port 2*ip* by Q1, the amount of liquid which flows into the second space B through the first suction port 1*ip* and/or the third suction port 3*ip* (FIG. 1) by Q2 (which is equal to Q2*a*+Q2*b*), and a change in the volume of the first space A which is attributable to the piston stroke by Q3, it will be seen that these variables are related to each other as indicated below.

$$Q3=2DS$$

$$Q2=2(D-C)S$$

$$Q1=Q3-Q2=2[D-(D-C)]S=2CS$$

When the suction Q2 of the pump 1 on the forward stroke is made equal to the suction Q1 of the pump 1 on the return stroke, or stated differently, when the suction Q2 during a first half revolution is made equal to the suction Q1 during a second half revolution of the eccentric cam 1*ca* which rotates through 360° during one revolution to equalize suction peaks in the suction line Pin, the following relationship:

$$2(D-C)S=2CS$$

can be used to solve for D or $$D-C=C$$

$$D=2C.$$

In this instance, the peak of a fluctuation in the suction which appears in the suction line Pin is lowest and peaks are even, thus achieving a high smoothing effect for the fluctuation in the suction.

Since the discharge Q is equal to the total suction, $$Q=Q1+Q2=2DS,$$

which remains the same as in a conventional reciprocating pump.

Figure 3A:
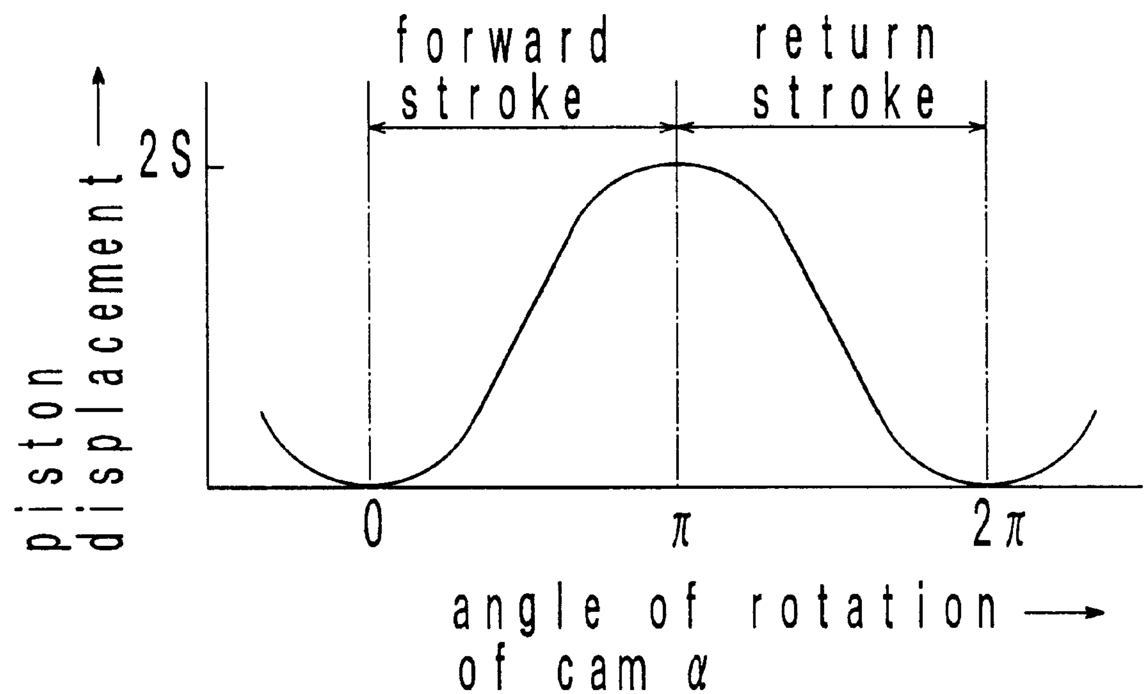
FIG. 3*a* graphically illustrates a relationship between the displacement of piston 1*p* and the angle of rotation of eccentric cam 1*ca* shown in FIG. 2.
Figure 3B:
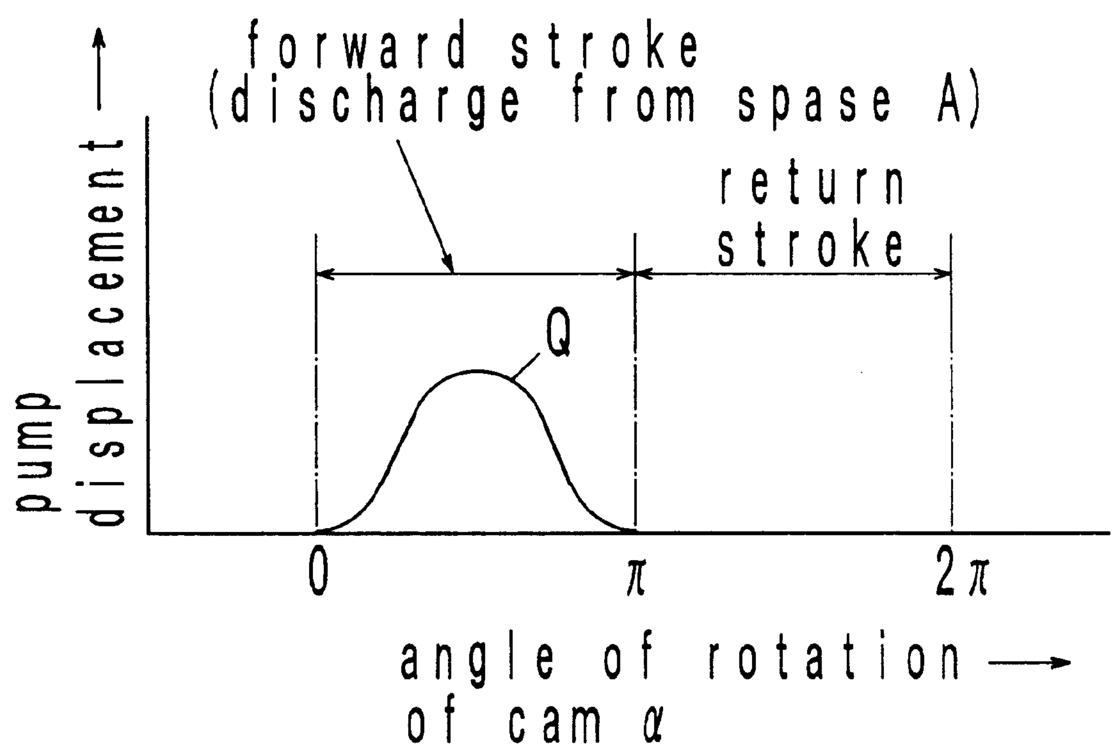
FIG. 3*b* graphically illustrates a relationship between the discharge flow rate of pump 1 and the angle of rotation of eccentric cam 1*ca* shown in FIG. 2.
Figure 3C:
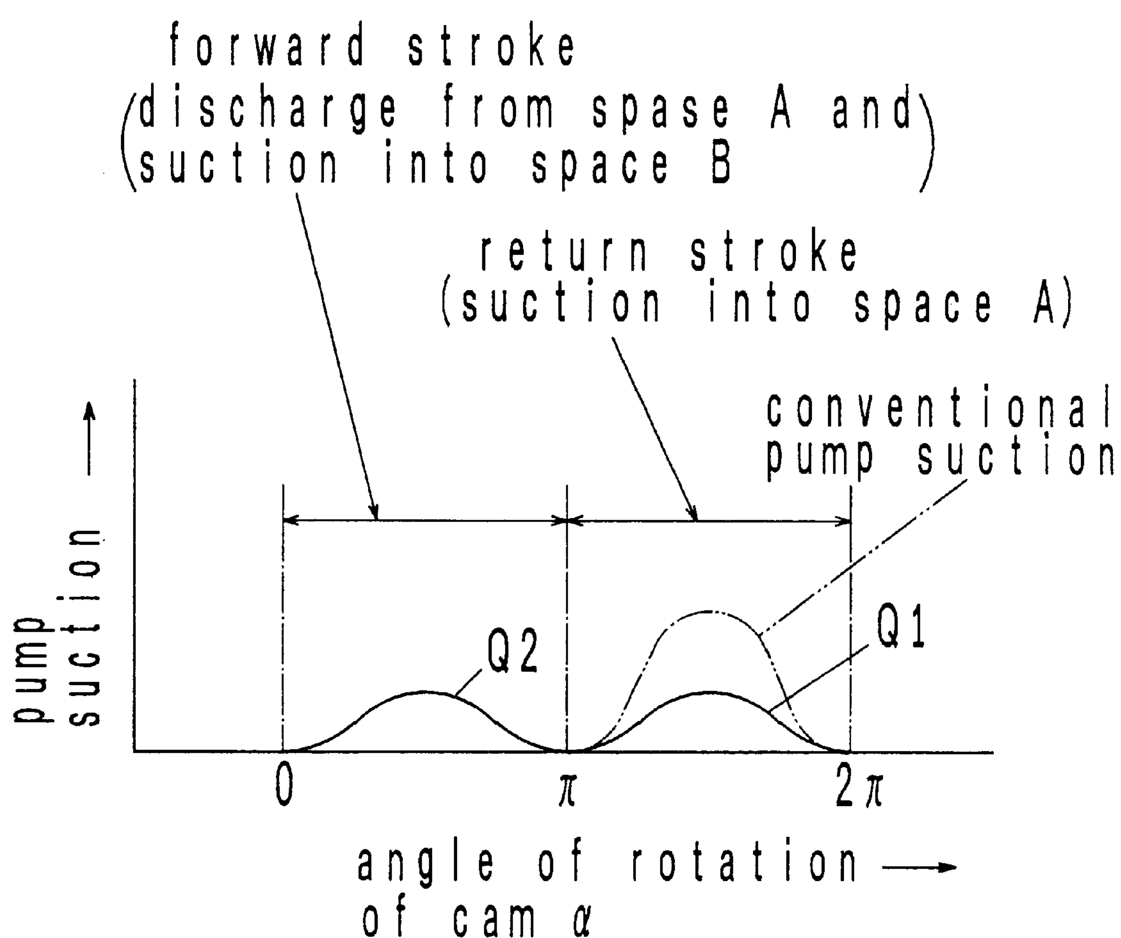
FIG. 3*c* graphically illustrates a relationship between the suction flow rate of pump 1 and the angle of rotation of eccentric cam 1*ca* shown in FIG. 2.
Figure 4:
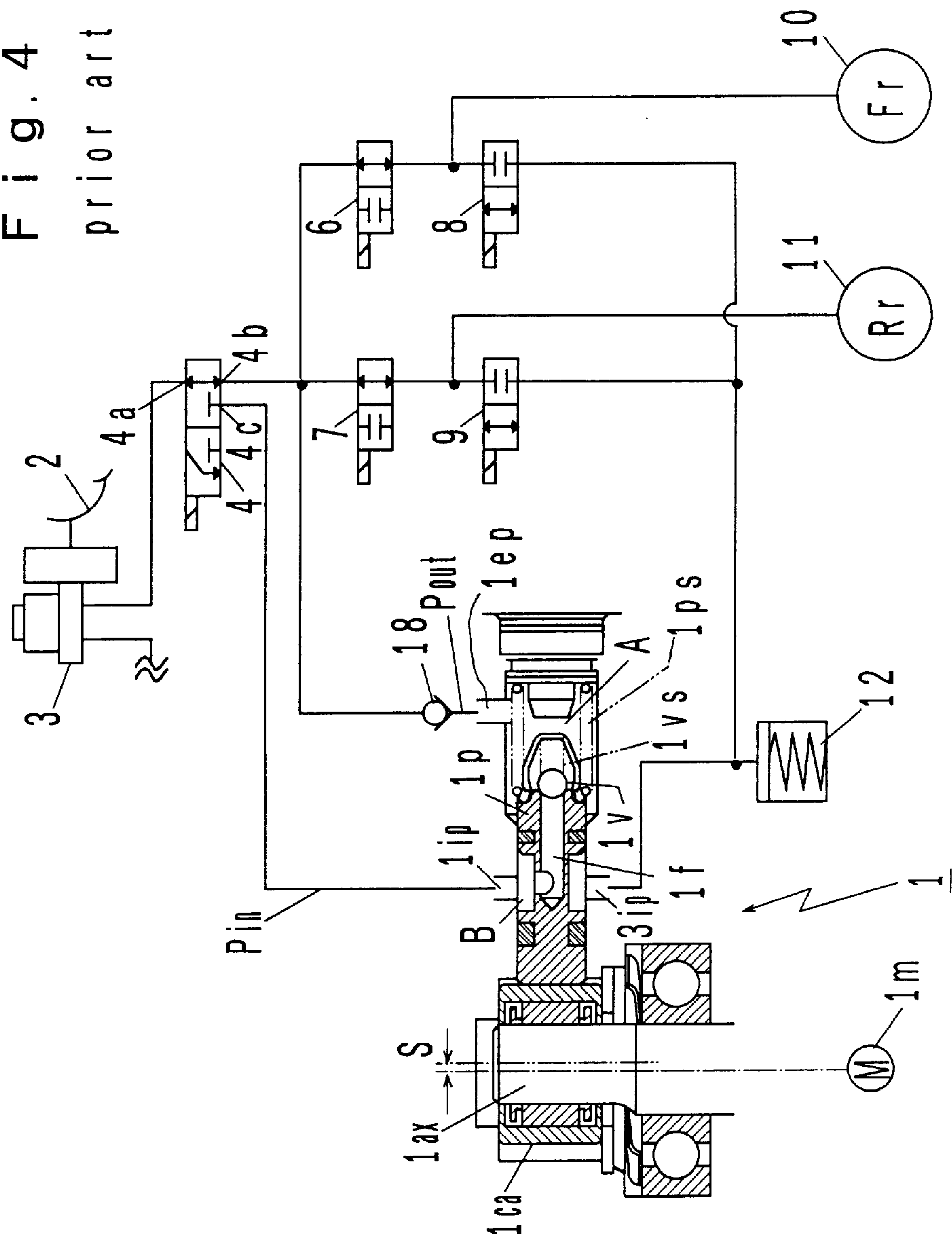
FIG. 4 is a block diagram of an exemplary brake pressure circuit of the prior art, with an arrangement around a pump plunger being shown in longitudinal section.

FIGS. 3*a* to 3*c* illustrate a piston displacement, and a change in the suction and the discharge of the braking liquid plotted against the angle of rotation of the cam or the piston position on the forward and the return stroke of the piston. Referring to FIG. 3*a* which illustrates a relationship between the piston displacement and the angle of rotation of the cam 1*ca*, it will be seen that when the eccentric cam 1*ca* rotates through $\pi$ or 180°, the piston 1*p* is displaced through 2S which is equivalent to twice the eccentricity S of the cam and returns to its original position after rotation through $2\pi$ or 360°. FIG. 3*b* shows the discharge of the braking liquid Q from the first space A on the forward stroke of the piston 1*p*. FIG. 3*c* shows the flow rate of braking liquid Q2 drawn into the second space B on the forward stroke of the piston 1*p* and the flow rate of braking liquid Q1 drawn into the first space A on the return stroke of the piston 1*p*. It will be noted that the suction of the braking liquid into the conventional pump (as illustrated in FIG. 4, for example) takes place only on the return stroke of the piston, and the resulting flow rate is shown in double dot chain lines in FIG. 3*c* for purpose of comparison.

By adjusting the diameter of the rod 1*r* in the design process, it is possible for the dispersed suction to occur on the forward stroke not only at a rate of Q1=Q2, but also at any rate for Q1<Q2 or Q1>Q2. Q1=Q2 is a preferred choice since then an extraordinary or abnormal sense as caused by an unintended depression of the pedal 2 or a stepwise depression of the pedal as the depression is increased can be eliminated, or suppressed. Since the amount of suction per suction process can be reduced to substantially one-half the conventional suction, a pressure loss $\Delta p(\Delta p\ v^2$, where v represents a flow velocity) involved with the suction line Pin and the switching valve 4 can be reduced by a factor of four, with consequence that the sizes of the line and the switching valve can be reduced.

While a preferred embodiment of the invention has been shown and described above, a number of changes and modifications are possible therein. Accordingly, it is not intended that the invention be limited to the specific construction or arrangement disclosed herein, but the right is reserved to all changes and modifications coming within the scope of the invention defined by the appended claims.

What is claimed is:

1. A reciprocating pump for generating a fluid pressure, comprising a cylinder;

a piston disposed within the cylinder to divide the internal space thereof into a first space and a second space and including a channel which provides a communication between the first and the second space, and a first check valve which permits a flow of a fluid through the channel from the second space to the first space while blocking a flow in the reverse direction, the piston having a first pressure receiving area which receives a fluid pressure in the second space in the direction of the center axis of the cylinder that is less than a second pressure receiving area which receives a fluid pressure in the first space in the same direction;

a second check valve which permits a flow of a fluid from the first space to a discharge line disposed outside the cylinder while blocking a flow in the reverse direction;

a third check valve which permits a flow of a fluid from a suction line disposed outside the cylinder to the second space while blocking a flow in the reverse direction;

a fourth check valve which permits a flow of a fluid from the suction line to the first space while blocking a flow in the reverse direction;

and means for driving the piston for reciprocatory motion.

2. A reciprocating pump according to claim 1 in which the cylinder includes a first cylinder space of a first diameter which provides the first space and a second cylinder space of a second diameter which is smaller than the first diameter which provides the second space and which continues to the first cylinder space, the pressure receiving surface of the piston which opposes the first space being disposed within the first cylinder space while the pressure receiving surface of the piston which opposes the second space is disposed within the second cylinder space.

3. A reciprocating pump according to claim 2, further comprising a coiled compression spring disposed within the first cylinder space for returning the piston.

4. A reciprocating pump according to claim 1, further comprising a rod extending from outside the cylinder through the second space in the direction of the center axis of the cylinder and continuing to the piston, the first pressure receiving area of the piston being less than the second pressure receiving area thereof by an amount which is equal to the cross-sectional area of the rod.

5. A reciprocating pump according to claim 4 in which the cylinder includes a first cylinder space of a first diameter which provides the first space and a second cylinder space of a second diameter which is smaller than the first diameter which provides the second space and which continues to the first cylinder space, the pressure receiving surface of the piston which opposes the first space being disposed within the first cylinder space while the pressure receiving surface of the piston which opposes the second space is disposed within the second cylinder space.

6. A reciprocating pump according to claim 5 in which said driving means includes a coiled compression spring disposed within the first cylinder space for returning the piston.

* * * * *

UNITED STATES PATENT AND TRADEMARK OFFICE

CERTIFICATE OF CORRECTION

PATENT NO. : 5,915,927

DATED : June 29, 1999

INVENTOR(S) : Hiromu Kuromitsu

It is certified that error appears in the above-identified patent and that said Letters Patent is hereby corrected as shown below:

On the title page, item: [73], should read--

Assignee: AISIN SEIKI KABUSHIKI KAISHA, Kariya, Japan --.

Signed and Sealed this

Sixteenth Day of May, 2000

Attest:

Q. TODD DICKINSON

*Attesting Officer*

*Director of Patents and Trademarks*